(12) United States Patent
Park

(10) Patent No.: US 8,296,277 B2
(45) Date of Patent: Oct. 23, 2012

(54) METHOD AND APPARATUS TO AUTOMATICALLY RECEIVE AND/OR TRANSMIT CONTENTS

(75) Inventor: Jee-hyung Park, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 369 days.

(21) Appl. No.: 12/036,388

(22) Filed: Feb. 25, 2008

(65) Prior Publication Data

US 2009/0055402 A1    Feb. 26, 2009

(30) Foreign Application Priority Data

Aug. 23, 2007   (KR) .................. 10-2007-0085006

(51) Int. Cl.
*G06F 7/00*   (2006.01)
*G06F 17/30*  (2006.01)
(52) U.S. Cl. ....................... 707/705; 707/736
(58) Field of Classification Search ............... 707/3, 10, 707/705, 736; 709/217
See application file for complete search history.

(56) References Cited

U.S. PATENT DOCUMENTS

| | | | | |
|---|---|---|---|---|
| 7,219,153 B1 * | 5/2007 | Day | ..................... | 709/229 |
| 2006/0008256 A1 * | 1/2006 | Khedouri et al. | ........... | 386/124 |
| 2006/0225138 A1 * | 10/2006 | Toyohara et al. | ............. | 726/27 |
| 2007/0039023 A1 * | 2/2007 | Kataoka | ................... | 725/46 |
| 2007/0207780 A1 * | 9/2007 | McLean | ................. | 455/414.1 |
| 2009/0070689 A1 * | 3/2009 | Park et al. | .................. | 715/760 |
| 2009/0080013 A1 * | 3/2009 | Sato et al. | ................... | 358/1.15 |

FOREIGN PATENT DOCUMENTS

| KR | 10-2004-0083718 | 10/2004 |
|---|---|---|
| KR | 10-2007-0027812 | 3/2007 |

OTHER PUBLICATIONS

KR Office Action issued Oct. 11, 2011 in KR Patent application No. 10-2007-0085006.

* cited by examiner

*Primary Examiner* — Christyann Pulliam
*Assistant Examiner* — Fariborz Khoshnoodi
(74) *Attorney, Agent, or Firm* — Stanzione & Kim, LLP

(57) ABSTRACT

A method and apparatus to automatically receive and/or transmit contents in which desired contents are automatically downloaded and streamed by using a rich site summary (RSS) function. The method includes receiving sample contents corresponding to previously set search conditions by connecting to a content server that has been previously linked with the content player when a web network is connected; notifying that the contents are updated when the sample contents are completely received; and receiving original contents corresponding to the sample contents in accordance with the selection of a user when the contents are completely updated.

21 Claims, 2 Drawing Sheets

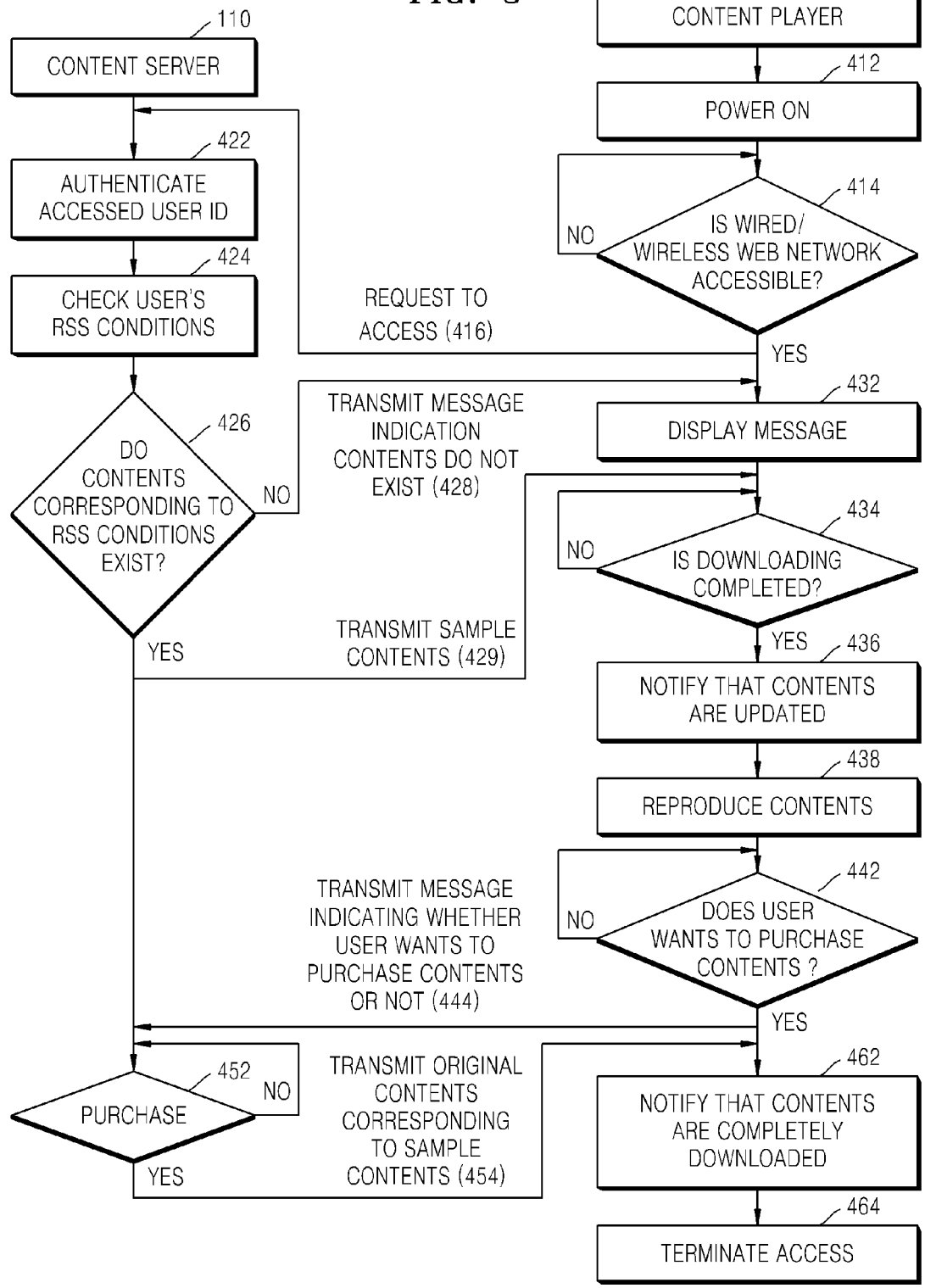

METHOD AND APPARATUS TO AUTOMATICALLY RECEIVE AND/OR TRANSMIT CONTENTS

CROSS-REFERENCE TO RELATED APPLICATIONS

This application claims priority under 35 U.S.C. §119(a) from Korean Patent Application No. 10-2007-0085006, filed on Aug. 23, 2007, in the Korean Intellectual Property Office, the disclosure of which is incorporated herein in its entirety by reference.

BACKGROUND OF THE INVENTION

1. Field of the Invention

The present general inventive concept relates to a service system to provide contents, and more particularly, to a method and apparatus to automatically receive and/or transmit contents in which desired contents are automatically downloaded and streamed by using a rich site summary (RSS) function.

2. Description of the Related Art

Conventionally, mobile content players include MPEG-1 Audio Layer 3 (MP3) players and portable multimedia players (PMPs). An MP3 player provides music files to a user, and the music files are provided by personal computers (PCs) or Internet sites. A PMP provides various video or music files to a user, and the video or music files also provided by the PCs and the Internet sites.

A user using the mobile content players visits or accesses an Internet site of a content provider by using a computer connected to the Internet, directly searches for desired contents, such as video or MP3 files, and downloads the video or MP3 files to the computer. Also, the user transmits the contents downloaded to the computer to the mobile content player by connecting a cable between the mobile content player and the computer through serial ports or universal serial bus (USB) ports.

However, in a conventional content reception method, the user has to directly search for recent contents or desired music by using a web browser of a PC or a mobile device.

SUMMARY OF THE INVENTION

The present general inventive concept provides a method and apparatus to automatically receive and/or transmit contents in which desired contents are automatically downloaded and streamed by using a rich site summary (RSS) function in a mobile content player that can access a web network.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of automatically receiving contents by a content player, the method including receiving sample contents corresponding to previously set search conditions by connecting to a content server that has been previously linked with the content player when a web network is connected, notifying that the contents are updated when the sample contents are completely received, and receiving original contents corresponding to the sample contents in accordance with the selection of a user when the contents are completely updated.

The foregoing and/or other aspects and utilities of the present general inventive concept may also be achieved by providing a method of automatically transmitting contents, the method including checking whether contents corresponding to previously set search conditions exist or not by a predetermined user authentication procedure when an access request is received from the content player, transmitting sample contents of the checked contents to a content player, and transmitting original contents corresponding to the sample contents to the content player if a purchase request of the contents is received from the content player.

The foregoing and/or other aspects and utilities of the present general inventive concept may also be achieved by providing a content player including a communication unit to communicate with a content server without using a web browser, and a control unit to control the communication unit to receive a sample content from the content server and to receive a content corresponding to the sample content.

When the communication unit is connected to the content server through the web browser, the control unit may set a search condition of the content, and when the communication unit is connected to the content server without using the web browser, the control units may transmit the search condition to the content server to receive the sample content to according to the search condition.

When the communication unit is connected to the content server through an external computer using the web browser, the control unit may set a search condition of the content, and when the communication unit is connected to the content server without using the web browser of the external computer, the control units may transmit the search condition to the content server to receive the sample content to according to the search condition.

When the communication unit is indirectly connected to the content server through an external computer, the control unit may set a search condition of the content, and when the communication unit is disconnected from the external computer and directly connected to the content server, the control units may transmit the search condition to the content server to receive the sample content to according to the search condition.

The control unit may store a previously set search condition, and may control the communication unit to communicate with the content server using the previously set search condition to receive the sample content.

The foregoing and/or other aspects and utilities of the present general inventive concept may also be achieved by providing a method of a content player, the method including communicating with a content server without using a web browser in a communicating unit, and controlling the communication unit to receive a sample content from the content server and to receive a content corresponding to the sample content.

The foregoing and/or other aspects and utilities of the present general inventive concept may also be achieved by providing a computer-readable medium to contain computer-readable codes as a program to execute a method of a content player, the method including communicating with a content server without using a web browser in a communicating unit, and controlling the communication unit to receive a sample content from the content server and to receive a content corresponding to the sample content.

The foregoing and/or other aspects and utilities of the present general inventive concept may also be achieved by providing a content player including a communication unit to communicate with a content server through an external computer and to communicate with the content server without using the external computer, and a control unit to store a search condition set when the communication unit communicates with the content server through the external computer and to receive a sample content from the content server when the communication unit communicates with the content server without using the external computer.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 3 is a flowchart illustrating a method of automatically receiving and/or transmitting contents between a content server and a content player according to an embodiment of the present general inventive concept.

DETAILED DESCRIPTION OF THE PREFERRED EMBODIMENTS

Figure 1:
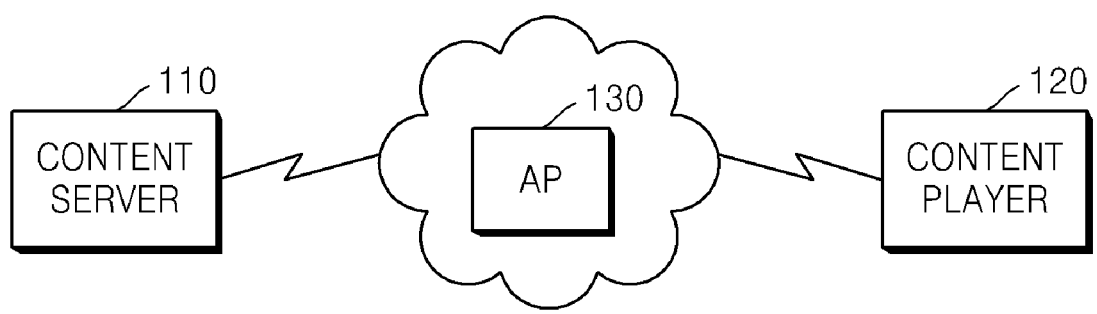
FIG. 1 is a block diagram illustrating a system to receive and/or transmit contents according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a system to receive and/or transmit contents according to an embodiment of the present general inventive concept.

Referring to FIG. 1, the system includes a content server 110, a content player 120, and an access point 130.

Wired/wireless bidirectional communication is performed by using the content server 110, the content player 120, and the access point 130.

The access point 130 receives previously set internet access information and relays an Internet service between the content server 110 and the content player 120.

If the content player 120 moves from a service area of the current access point 130 to another service area of another access point, the content player 120 and the content server 110 are connected to each other by the other access point.

When the content server 110 receives an access request from the content player 120 through the access point 130, the content server 110 checks whether contents corresponding to previously set search conditions exist or not by a predetermined user authentication procedure, transmits sample contents of the corresponding contents to the content player 120 when the corresponding contents exist, and transmits original contents corresponding to the sample contents to the content player 120 if a purchase request of the corresponding contents is received from the content player 120.

According to another embodiment of the present general inventive concept, the content server 110 accumulates or stores user data received from and transmitted to the content player 120 so as to generate a history file.

The content player 120 may automatically stream and download the contents from the content server 110 without using a web browser connecting to a web site operated by the content server 10 as soon as the content player 120 is connected to a web network. That is, when the web network is connected through the access point 130, the content player 120 receives the sample contents corresponding to the previously set search conditions from the content server 110 that has been previously linked with the content player 120, notifies a user that the contents are updated when the sample contents are completely received, and downloads or streams the original contents corresponding to the sample contents in accordance with the selection of the user after the contents are completely updated.

Figure 2:
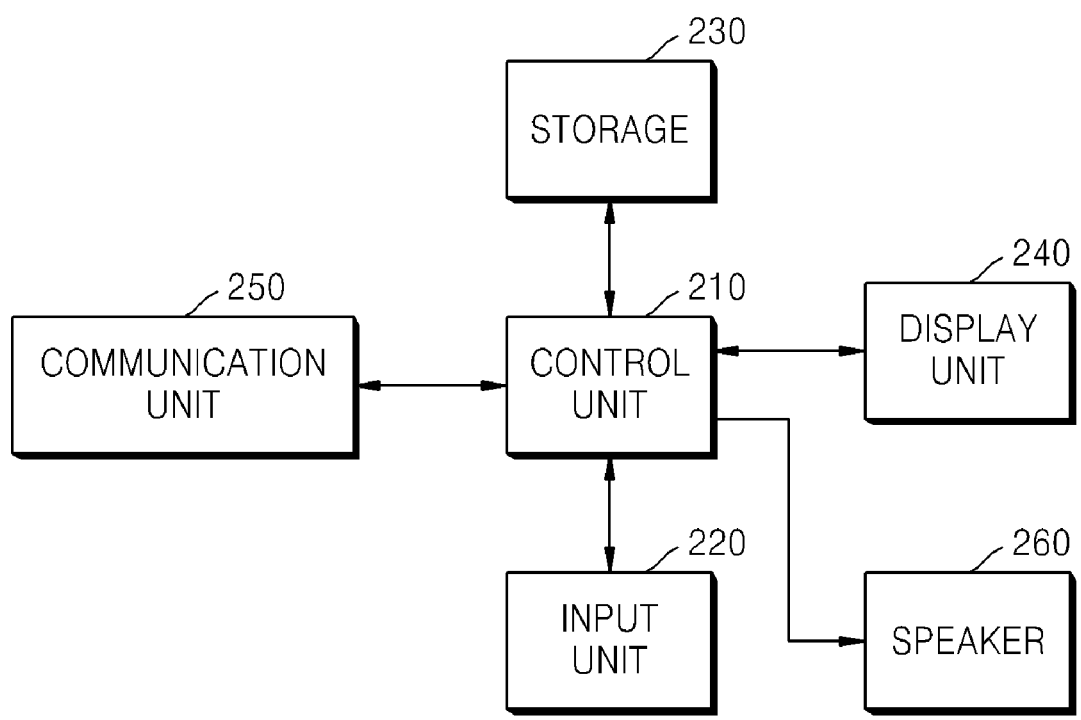
FIG. 2 is a detailed block diagram illustrating a content player such as a content player illustrated in FIG. 1 according to an embodiment of the present general inventive concept.

FIG. 2 is a detailed block diagram illustrating a content player such as the content player 120 of the system of FIG. 1 according to an embodiment of the present general inventive concept.

Referring to FIGS. 1 and 2, the content player 120 includes a control unit 210, an input unit 220, storage 230, a display unit 240, a communication unit 250, and a speaker 260.

The input unit 220 may include a plurality of key modules or a touch screen to input one or more commands or instructions by a user.

The storage 230 may be a flash memory or a hard disk drive to store various contents and a control program that operates the control unit 210.

The display unit 240 displays various information by using a pop-up window or a graphic image in correspondence with operations of the control unit 210.

The communication unit 250 includes a wired and/or wireless communication interface to perform wired and/or wireless bidirectional communication with a content server through an access point.

The speaker 260 reproduces an audio signal output from the control unit 210 or the storage 230.

When the web network is connected, the control unit 210 receives sample contents corresponding to previously set search conditions from the content server 110 that has been previously linked with the content player 120, stores the sample contents in the storage 230, outputs notification information to the display unit 240 or the speaker 260 if the sample contents are completely received or downloaded by the communication unit 250, and downloads or streams original content corresponding to the sample contents from the content server 110 in accordance with selection of the user which is input by the input unit 220 when the contents are completely updated.

FIG. 3 is a flowchart of a method of automatically receiving and/or transmitting contents between a content server and a content player of a system according to an embodiment of the present general inventive concept.

Referring to FIGS. 1, 2 and 3, a user of the content player 120 sets search conditions at a web site of the content server 110 previously linked with the content player 120. In this case, a search defined by the search conditions is performed by using a rich site summary (RSS) function.

Here, the content player 120 has been previously connected to the web site of the content server 110 through a computer using a browser, and then the content player 120 is later connected to the content server 110 without using the browser of the computer according to the present embodiment. Even if the content player 120 is connected to the content server 110 through the computer, the browser may not be used to connect the content player 120 and the content server 110.

For example, the user sets recent movie trailer videos or recent songs of certain singers to the content server 110 by using the RSS function.

In this case, RSS is an acronym of resource description framework (RDF) site summary or rich site summary and is a data format generated based on an extensible markup language (XML) in order to easily provide updated information to users from web sites such as news sites or blogs in which contents are frequently updated. When an RSS address provided by a web site is registered to an RSS reader program of the user, the user may easily check and use updated information without visiting the web site whenever the user wants to update contents.

When the content player 120 is powered on in a power on mode in operation 412, the accessibility of a wired/wireless web network is checked in operation 414. For example, the content player 120 may include a program to periodically check whether the content player 120 exists in a service area of a base station or an access point by using a beacon signal generated from the base station or the access point.

Then, if it is determined that the wired/wireless web network is accessible, the content player 120 transmits an access request to the content server 110 in operation 416. According to another embodiment of the present general inventive concept, the content player 120 may transmit the access request signal through manipulation of a button by the user. In this case, the access request signal may be, for example, identification (ID) information and a media access control (MAC) address of the content player 120.

When the content player 120 of the user accesses the wired/wireless web network by a personal computer PC, the content player 120 transmits the access request signal to the content server 110.

The content server 110 receives the access request signal from the content player 120 and authenticates a user ID of the content player 120 or a client transmitted the access request signal, by a predetermined authentication procedure in operation 422.

When the authentication procedure is completed, the content server 110 allows access and checks RSS conditions corresponding to the user ID in operation 424.

The content server 110 searches a database for the RSS conditions corresponding to the user ID and checks whether contents corresponding to the RSS conditions exist or not in operation 426.

If the contents corresponding to the RSS conditions do not exist, the content server 110 transmits a message indicating that the corresponding contents do not exist to the content player 120 in operation 428. In this case, the content player 120 displays the message on a screen in operation 432.

The content player 120 may request the content server 110 to repeat operation 426 after operation 432 has been performed. It is possible that the content player 120 may perform operation 464 after operation 432 has been performed.

However, if the contents corresponding to the RSS conditions exist, the content server 110 transmits sample contents of the corresponding contents to the content player 120 in operation 429. According to another embodiment of the present general inventive concept, the content server 110 may transmit original contents instead of the sample contents by limiting, for example, an available number of reproductions of the original contents or a duration of a reproduction of the original contents.

Then, the content player 120 downloads the sample contents transmitted from the content server 110. In this case, when the sample contents are completely downloaded, the content player 120 notifies the user that the contents are updated using a user interface. In this case, notification information of the update can be indicated by using vibration, a pop-up window, or sound for a predetermined period of time.

Then, the user checks the contents (i.e., sample contents) stored in the content player 120 or streamable contents and determines whether to purchase the contents or not.

Accordingly, the content player 120 reproduces the downloaded sample contents automatically or in response to user selection in operation 438. The content player 120 displays a messages to check whether to purchase the original contents corresponding to the sample contents or not through the user interface. In this case, the content player 120 checks the determination of the user by using the user interface in operation 442.

The content player 120 transmits a message to indicate whether the corresponding contents are determined to be purchased or not, to the content server 110 in operation 444.

Then, the content server 110 checks the message to indicate whether the corresponding contents are determined to be purchased or not. In this case, if the corresponding contents are determined to be purchased in operation 452, the content server 110 transmits the original contents corresponding to the sample contents to the content player 120 in operation 454.

The content player 120 downloads the original contents corresponding to the sample contents and notifies the user when the original contents are completely downloaded in operation 462.

And then, the content player 120 terminates connection to the content server 110 in operation 463.

The present general inventive concept can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present general inventive concept, as soon as a web network is connected, contents may be automatically streamed and downloaded from a content server without being connected to a web site of the content server. Thus, a user may easily purchase desired contents by using a purchase button and a pop-up window provided by a mobile content player such as an MP3 player or a PMP.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of automatically receiving contents by a content player, the method comprising:
setting search conditions having a rich site summary (RSS) format previous to searching contents stored on a content server;
communicating with a content server having an RSS, and automatically searching the content server using a RSS function of an RSS reader, without using a web browser, based on the previously set search conditions in response to connecting the content player to a web network;
receiving sample contents corresponding to the previously set search conditions without using a web browser by connecting to the content server that has been previously linked with the content player when the web network is connected;

notifying that the contents are updated when the sample contents are completely received;

displaying a message requesting purchase of the contents; and receiving original contents without using a web browser, the original contents corresponding to the sample contents in accordance with the selection of a user when the contents are completely updated, wherein the connecting of the web network includes connecting by automatically checking whether the web network is accessible, and automatically transmitting an access request to the content server in response to accessing the web network.

2. The method of claim 1, further comprising:
setting user's search conditions in a web site of the content server previously linked with the content player.

3. The method of claim 1, wherein the connecting of the web network comprises:
transmitting an access request to the content server in response to accessing the wired/wireless web network is accessible.

4. The method of claim 1, wherein the connecting of the web network further comprises accessing the web network in accordance with the selection of the user.

5. The method of claim 1, further comprising:
displaying messages checking whether the user wants to purchase the contents or not using a user interface when the contents are completely updated; and
transmitting a message requesting purchase of the contents to the content server.

6. The method of claim 1, further comprising:
receiving a message indicating that the contents do not exist if the contents corresponding to the previously set search conditions do not exist.

7. The method of claim 1, wherein the updating of the contents is indicated by using vibration, a message, or a pop-up window for a predetermined period of time.

8. The method of claim 1, wherein the contents are received by downloading or streaming the contents.

9. A method of automatically transmitting contents to a content player, the method comprising:
setting search conditions having a rich site summary RSS format previous to searching contents stored on a content server;
searching automatically the content server using a RSS function without using a web browser based on the previously set search conditions in response to connecting the content player to a web network;
checking whether contents corresponding to the previously set search conditions exist or not by a predetermined user authentication procedure when an access request is received from the content player;
transmitting sample contents of the checked contents to the content player without using a web browser; and
transmitting original contents corresponding to the sample contents to the content player without using a web browser if a purchase request of the contents is received from the content player; and
displaying a message requesting purchase of the contents,
wherein the connecting of the web network includes connecting by automatically checking whether the web network is accessible, and automatically transmitting an access request to the content server in response to accessing the wired/wireless web network.

10. The method of claim 9, wherein, if the contents corresponding to the previously set search conditions do not exist, a message indicating that the corresponding contents do not exist is transmitted to the content player.

11. The method of claim 9, wherein user data received from and transmitted to the content player is accumulated so as to generate a history file.

12. A content player comprising:
a communication unit to perform wired and/or wireless bidirectional communication with a content server having an RSS address through an access point;
an input unit to input selection of a user;
an RSS reader module to request the RSS address of the content server without using a web browser and in response to the communication unit detecting the access point, and to receive the RSS address from the content server, and to automatically determine that the content server includes updated content information based on the RSS address; and
a control unit to receive sample contents of the updated content information without using a web browser, the sample contents based on previously set search conditions from the content server corresponding to the RSS address when a web network is connected, to generate notification information to indicate that the sample contents are completely received or downloaded by the communication unit, and to download or stream original content corresponding to the sample contents from the content server without using a web browser in accordance with the selection of the user; and
a display unit to display a message requesting purchase of the contents,
wherein the connecting of the web network includes connecting by automatically checking whether the web network is accessible, and automatically transmitting an access request to the content server in response to accessing the web network.

13. The content player of claim 12, further comprising:
a display unit to display the notification information by using a pop-up window.

14. A content player comprising:
a communication unit to communicate with a content server having an RSS address without using a web browser;
an RSS reader module to request the RSS address without using a web browser from the content server in response to connecting the content player to a web network to receive the RSS address from the content server and to automatically determine a content server having updated content information based on the RSS address; and
a control unit to control the communication unit to receive a sample content of the updated content information without using a web browser, the sample content based on previously set search conditions from the content server corresponding to the RSS address and to receive a content corresponding to the sample content without using a web browser when RSS reader module determines the content server corresponding to the received RSS address has updated content; and
a display unit to display a message requesting purchase of the contents,
wherein the connecting of the web network includes connecting by automatically checking whether the web network is accessible, and automatically transmitting an access request to the content server in response to accessing the web network.

15. The content player of claim 14, wherein:
when the communication unit is connected to the content server through the web browser, the control unit sets a search condition of the content; and
when the communication unit is connected to the content server without using the web browser, the control units transmits the search condition to the content server to receive the sample content to according to the search condition.

16. The content player of claim 14, wherein:
when the communication unit is connected to the content server through an external computer using the web browser, the control unit sets a search condition of the content; and
when the communication unit is connected to the content server without using the web browser of the external computer, the control units transmits the search condition to the content server to receive the sample content to according to the search condition.

17. The content player of claim 14, wherein:
when the communication unit is indirectly connected to the content server through an external computer, the control unit sets a search condition of the content; and
when the communication unit is disconnected from the external computer and directly connected to the content server, the control units transmits the search condition to the content server to receive the sample content to according to the search condition.

18. The content player of claim 14, wherein the control unit stores a previously set search condition, and controls the communication unit to communicate with the content server using the previously set search condition to receive the sample content.

19. A method of a content player, the method comprising:
requesting an RSS address from the content server using an RSS reader without using a web browser in response to the content player connecting to a wireless network, and receiving the RSS address corresponding to the content server and automatically determining whether the content server has updated content information based on the RSS address;
communicating with the content server corresponding to the RSS address without using a web browser in a communicating unit; and
controlling the communication unit to receive a sample content of the updated content without using a web browser, the sample content corresponding to previously set search conditions having a rich site summary (RSS) format from the content server and to receive the updated content corresponding to the sample content without using a web browser; and
displaying a message requesting purchase of the contents,
wherein the connecting of the web network includes connecting by automatically checking whether the web network is accessible, and automatically transmitting an access request to the content server in response to accessing the web network.

20. A computer-readable medium to contain computer-readable codes as a program to execute a method of a content player, the method comprising:
requesting an RSS address from the content server using an RSS reader without using a web browser in response to the content player connecting to a wireless network, and receiving the RSS address corresponding to the content server and automatically determining the content server has updated content information based on the RSS address;
communicating with the content server corresponding to the RSS address without using a web browser in a communicating unit; and
controlling the communication unit to receive a sample content of the updated content without using a web browser, the sample content corresponding to previously set search conditions having a rich site summary (RSS) format from the content server and to receive the updated content corresponding to the sample content without using a web browser; and
displaying a message requesting purchase of the contents,
wherein the connecting of the web network includes connecting by automatically checking whether the web network is accessible, and automatically transmitting an access request to the content server in response to accessing the web network.

21. A content player comprising:
an RSS reader module to request the RSS address of the content server without using a web browser and in response to the communication unit detecting the access point, and to automatically determine when a content server having an RSS address includes updated content information in response to receiving the RSS address;
a communication unit to communicate with the content server corresponding to the RSS address through an external computer, and to communicate with the content server corresponding to the RSS address without using the external computer; and
a control unit to store a previously set search condition corresponding with content stored on a content server set when the communication unit communicates with the content server through the external computer and to receive a sample content of the content stored on the content server without using a web browser, the sample contents based on the previously set search condition from the content server when the RSS reader module determines the content server corresponding to the received RSS address includes updated content; and
displaying a message requesting purchase of the contents,
wherein the connecting of the web network includes connecting by automatically checking whether the web network is accessible, and automatically transmitting an access request to the content server in response to accessing the web network.

* * * * *